April 30, 1968   R. A. LOOSE   3,380,889
BORIC ACID REMOVAL PROCESS AND APPARATUS
Filed March 30, 1966   2 Sheets-Sheet 1

WITNESSES
Theodore F. Wedel
Lee P. Johns

INVENTOR
Robert A. Loose
BY
Frederick Shapoe
ATTORNEY

United States Patent Office 3,380,889
Patented Apr. 30, 1968

3,380,889
BORIC ACID REMOVAL PROCESS
AND APPARATUS
Robert A. Loose, Murrysville, Pa., assignor to Westinghouse Electric Corporation, Pittsburgh, Pa., a corporation of Pennsylvania
Filed Mar. 30, 1966, Ser. No. 538,828
12 Claims. (Cl. 176—22)

ABSTRACT OF THE DISCLOSURE

An apparatus and method for controlling the output of a nuclear power reactor in response to the reactor load requirements by varying the boric acid concentration in the reactor coolant system.

---

Figure 1:
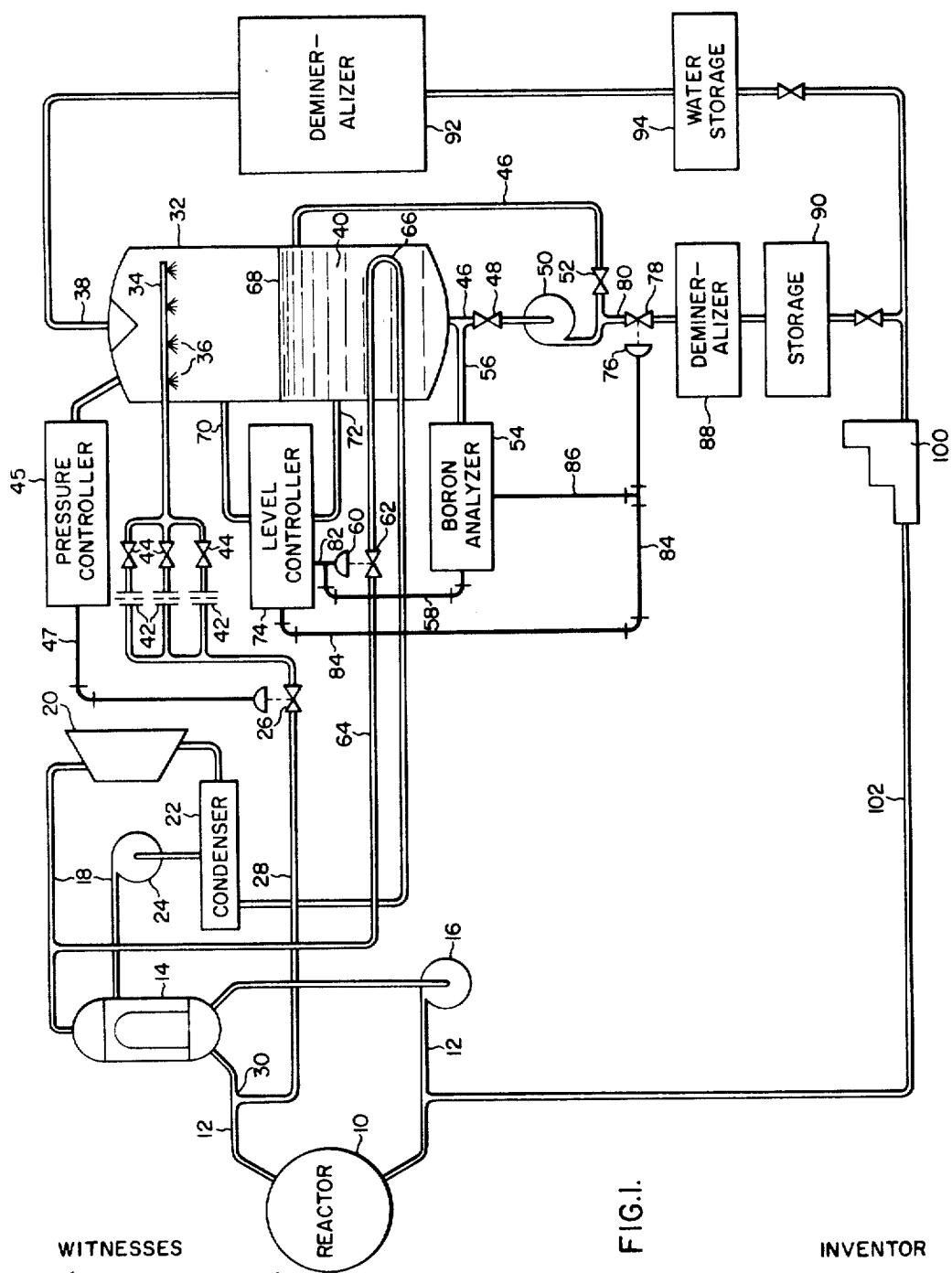

This invention relates to pressurized water nuclear reactors. More particularly, it pertains to the control of boric acid concentration in a reactor coolant system.

The continuing advances in the technology of nuclear reactors have led to increasing acceptance of chemical neutron absorbers, or the so-called "chemical shim," in the reactor coolant to supplement the use of mechanical control rods. One advantage of using chemical shim is that it permits improved core performance through reduction of the maximum to average power density. Another advantage is that the mechanical control rod requirements are reduced so that greater flexibility is obtained in fuel assembly mechanical design.

The chemical shim effect is provided by boron in the form of boric acid which is added to the reactor coolant. The concentration of boric acid in the coolant is varied during the life of the core to match the changes in reactivity with burn-up of fuel and long time transients. At the beginning of a fuel cycle, a predetermined concentration of boric acid is mixed with the reactor coolant to hold down excess reactivity. As the initial reactivity of the core decreases with time, the boric acid is withdrawn from the coolant in precise amounts. In this manner it is possible to assure more nearly optimum reactor operation by controlling the reactivity effects of temperature changes in the coolant, the buildup and decay of xenon and cesium, and the depletion of fissionable material and consequent buildup of all fission products.

Chemical shim is not used to control rapid changes because this function is accomplished by the mechanical control rods. The use of chemical shim control in the pressurized water reactor contributes markedly to the minimization of power production costs. Its advantages over competing control systems lies in the following principal areas: power distribution, fuel utilization, and the cost of achieving control.

Relatively large changes in electrical output from a chemical shim nuclear power plant are accommodated by varying the boric acid concentration in the reactor coolant system. Daily and weekly load changes require that the boric acid concentration in the reactor coolant be increased and decreased as necessary to follow xenon transients. The concentration is increased by draining some coolant from the reactor coolant system and replacing it with concentrated boric acid solutions. The boric acid concentration is reduced by draining coolant from the reactor coolant system and replacing it with demineralized water.

A factor involved in the process is the fact that reactor coolant which is drained from the coolant system must be cooled from approximately 550° F. to approximately 150° F. to permit storage of the coolant in low pressure storage tanks. After being cooled, the coolant is sent to the waste disposal system for storage and processing. The coolant is processed by evaporation which separates the coolant into concentrated boric acid and water condensate.

Various disadvantages are associated with the foregoing process. In the first place, relatively large volumes of borated water must be processed which involves the expense of large storage tanks, operating personnel, and operating costs such as incurred in reheating the coolant to remove the boric acid. Moreover, considerable heat is expended because of the requirement of first cooling the coolant from approximately 550° to 150° F. for storage purposes and subsequently reheating the coolant to evaporate the water.

It has been found that the foregoing disadvantages may be overcome by providing for recovery of a boric acid solution at a selected high concentration by controllably evaporating water from drained hot reactor coolant.

Accordingly, it is a general object of this invention to provide in a nuclear reactor system a boric acid removal system which eliminates the need for tankage in the waste disposal system for storing borated coolant drained from the reactor coolant system.

It is another object of this invention to provide a boric acid removal system which avoids the need for cooling and subsequently reheating the reactor coolant for removing boric acid from the coolant water.

It is another object of this invention to provide a boric acid removal system which enables the reuse of concentrated boric acid and eliminates the mixing of batches of concentrated boric acid except for small amounts required for leakage makeup.

It is another object of this invention to provide a boric acid removal system which enables the reuse of the condensate after removal of boric acid and thereby reduces the inventory of demineralized water.

Finally, it is an object of this invention to satisfy the foregoing objects and desiderata in a simple and expedient manner.

Briefly, the present invention involves a system for recovering boric acid from a water coolant for a nuclear reactor through which the coolant is circulated. The system includes an evaporator for removing steam from the coolant leaving concentrated boric acid solution. The concentrated solution or concentrate is continuously circulated through the evaporator. A device for analyzing the boric acid concentration is associated with the evaporator, as in a concentrate circulating conduit. When the boric acid concentration reaches a preset value, the analyzing device operates a diverting valve by which the concentrate is passed to a concentrate storage tank. However, the valve is not opened unless the level of the boric acid concentrate in the evaporator is at a proper level and for that purpose the boric acid analyzer is interconnected with means for detecting the upper and lower limits of the level of the condensate within the evaporator. Furthermore, a heating means, such as a steam coil, is controlled (1) by the analyzing device to heat the boric acid in the evaporator means when the concentration is below the preset value, while the heat is shut off if the boric acid concentration is at the level or higher and (2) by the upper and lower level limits device to heat the boric acid in the evaporator if it is above the upper level and does not allow heat to be supplied if the boric acid is below the lower limit.

Figure 2:
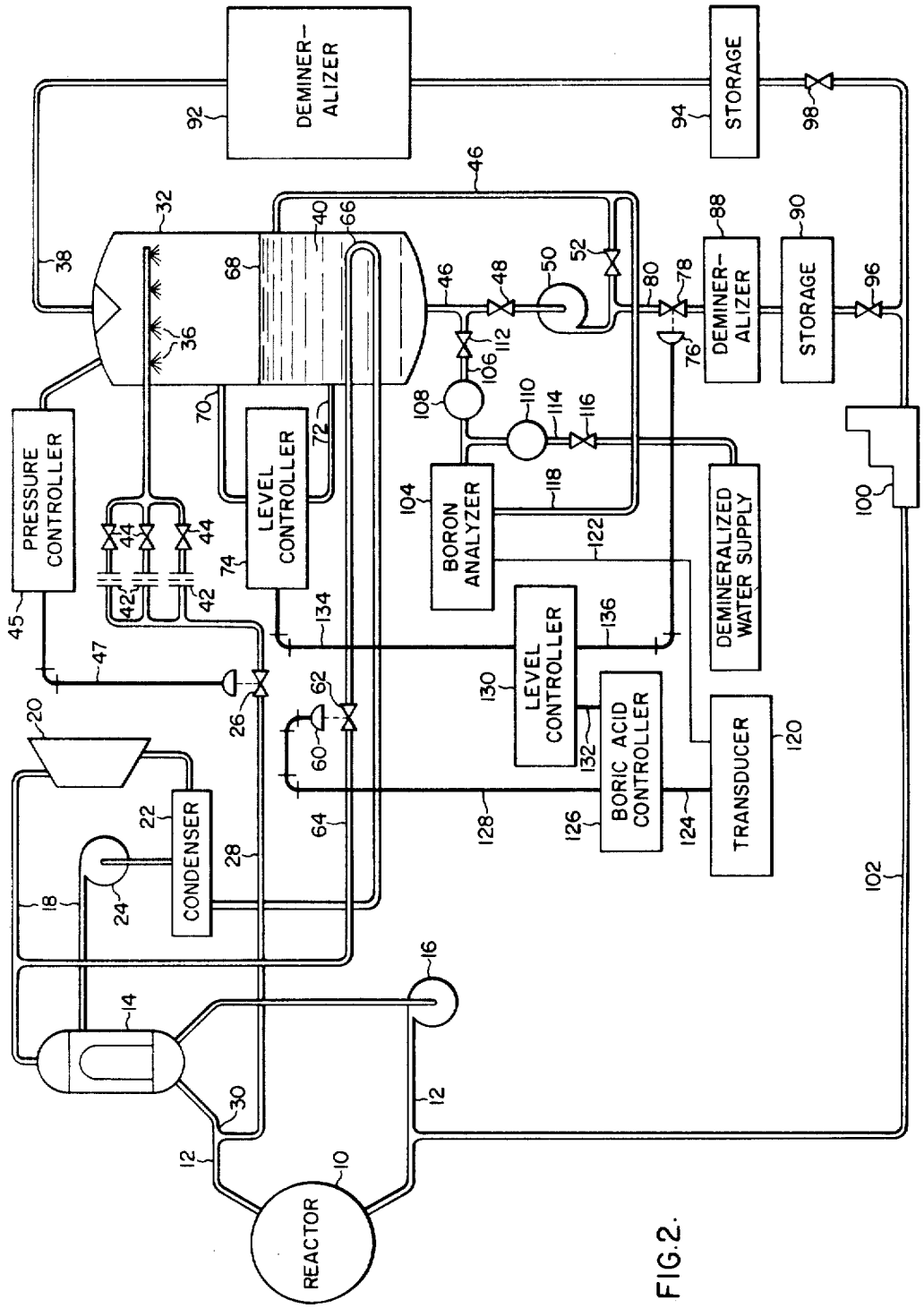

For a better understanding of the invention reference is made to the drawings in which:

FIG. 1 is a diagrammatic view showing the manner in which the concentration of boric acid solution is regulated; and FIG. 2 is a diagrammatic view showing another embodiment of the invention.

Similar numerals refer to similar parts throughout the several views of the drawings.

In FIG. 1 a reactor system is shown which includes a reactor 10, a primary or reactor coolant piping system 12, a heat exchanger or steam generator 14, and a pump 16. Associated with the reactor system is a secondary conduit or steam system 18 which includes a turbine 20, condenser 22, and a pump 24.

When it is necessary to remove the boron in the form of boric acid ($H_3BO_3$) from the reactor coolant, a valve 26 is opened in a conduit 28 which is connected at 30 to the primary conduit 12. The other end portion 34 of the conduit 28 extends into an evaporator tank 32. The coolant is flashed at 36 by spraying into the interior of the evaporator 32. Forty percent of the coolant flashes into steam and passes out of the upper end of the evaporator 32 via a conduit 38. The remaining 60% of the coolant including all (except for a small amount carried over with the steam) of the boric acid settles into a pool as a concentrate at the lower end portion of the evaporator 32.

To reduce the pressure of the coolant which is of the order of 2000 p.s.i.g. in the primary or reactor coolant system 12 to about 5 p.s.i.g. within the evaporator 32, a plurality of pressure reducing orifices 42 with corresponding valves 44 are provided in the conduit 28. The temperature of the coolant within the primary piping system 12 is about 600° F. before the coolant enters the heat exchanger 14, and is about 560° F. after leaving the heat exchanger. The temperature of the steam chamber above the concentrate 40 within the evaporator 32 is about 224°–230° F.

During normal operation of the evaporator 32 the concentrate 40 is circulated through a conduit system 46 which leads from the lower end of the evaporator 32 and around to the side thereof. The conduit 46 includes a valve 48, a pump 50, and a valve 52. The concentrate 40 circulates constantly to maintain a homogeneous solution of boric acid within the concentrate.

As shown in FIG. 1, a boron analyzer 54 is mounted in a conduit 56 through which samples of the concentrate 40 are withdrawn continuously from the conduit 46. The analyzer is a commercially available product. The analyzer 54 is preset to respond to a predetermined percentage, say 12 weight percent of boric acid, in the concentrate 40. If the percentage of boric acid in the concentrate 40 is less than 12%, the analyzer transmits a signal to control the air pressure in the air line 58 to a diaphragm air operator 60 to open a valve 62 in the steam line 64 to admit steam to a heating coil 66. The concentrate 40 is heated to boil off water and thereby increase the boron concentration. The valve 62, however, is not opened unless the level 68 of the concentrate 40 is above the heating coil 66.

For emergency purposes a pressure indicator controller 45 is connected to the valve 26 by an air line 47 for closing the valve 26 when the pressure within the evaporator exceeds a predetermined safe level.

A lower level tap 72 is provided at a level just above the coil 66. Both taps 70 and 72 operate in conjunction with a level indicating controller or transmitter 74 which in turn operates in conjunction with the diaphragm operator 60 for operating a valve 78 in a conduit 80. The controller 74 is connected to the diaphragm operators 60 and 76 by air lines 82 and 84, respectively. The controller 74 is a commercially available instrument and known in the art.

Accordingly, if the level 68 of the concentrate 40 is above the lower tap 72 and the percentage of boric acid in the concentrate is less than 12%, the diaphragm operator 60 is actuated to open the valve 62 to admit steam to the heating coil 66 to boil off the water in the concentrate.

If the percentage of boric acid in the concentrate is 12% or greater and the level 68 is above a preset value, such as the lower level tap 72, the analyzer 54 and controller 74 will transmit a signal which actuates the diaphragm operator 76 and opens the valve 78. So long as the percentage of boric acid is 12% or greater and the level 68 is above a preset value, the valve 78 remains open and concentrate 40 flows through the conduit 80 and into a demineralizing plant 88 for removal of such impurities as chlorides, iodine, sodium, etc. The concentrate then flows to a storage tank 90. Concentrated boric acid is withdrawn from the tank 32 when the concentrate level 68 is above the lower level tap 72 and below the upper level tap 70.

As steam leaves the evaporator 32 it is condensed to water and passed through a demineralizing plant 92 for the removal of such impurities as fission products and then flows to a storage tank 94.

At such times as are necessary to make up a quantity of coolant in the primary or reactor coolant system 12 a low level signal is sent to valves 96 and 98 for admitting a desired amount of conditioned boric acid solution and/or demineralized water from the storage tanks 90 and 94. For that purpose a positive displacement charging pump 100 is provided in a conduit 102 for pumping the blended make-up solution into the primary system 12.

Another form of the invention is shown in FIG. 2 in which parts similar to those of FIG. 1 are identified with similar numerals. The device of FIG. 2 is based upon an operation of maintaining a 12 weight percent boric acid solution in the concentrate within the evaporator 32, which is equal to about 20,000 p.p.m. of boron. The concentrate 40 circulates around the mixing circuit including the conduit 46 and the pump 50. A boric acid analyzer 104 is mounted in a line 106 for withdrawing 30 to 50 cc. per minute of the concentrate from the conduit 46 for analysis purposes. The analyzer 104 is a process flame photometer type and is commercially available which is adapted to accommodate a solution containing only 200 p.p.m. of boron. For that reason, a sample diluting system is provided which includes a pair of rotometers 108 and 110, the former of which is mounted in the line 106 between the analyzer 103 and a valve 112. The rotometer 110 is mounted in a line 114 having a valve 116 for introducing demineralized water such as from the tank 94. The rotometers 108 and 110 are synchronized to introduce metered amounts of concentrate 40 and water into the line 106 leading into the analyzer 104.

After the boric acid concentration is analyzed the sample may be disposed of through a waste outlet or returned via a line 118 to the conduit 46. If the resulting analysis of boric acid is equal to or greater than the preset 12% value, the analyzer 104 transmits an electric signal to a transducer 120 for transforming a signal from electric to air. The transducer is commercially available and well known in the art. An electric current is transmitted from the analyzer 104 to the transducer 120 by a wire 122. An air conduit 124 extends from the transducer 120 to a boric acid controller 126 which receives a signal from the analyzer 104 via the transducer 120 and signals an alarm for a high or low value. For example, if the boric acid reaches a value of say 11.8% or 12.2%, the controller issues an audible or light signal. The controller is a commercially available instrument.

If the boric acid concentration is lower than the preset 12% value such as 11.8%, the controller 126 issues an air impulse through the air conduit 128 to open valve 62 via the diaphragm operator 60 to open the valve to admit steam to the heating coil 66, thereby evaporating more water from the concentrate 40 in the evaporator 32. However, the valve 62 will not open if the level 68 of the concentrate 40 is below a predetermined set point in the evaporator 32.

As shown on FIGURE 2, a proportional level indicating controller 130 is connected to level transmitter 74 by air line 134. The controller 130 is commercially available. The level controller 130 maintains the concentrate level 68 at a relatively constant value. If the concentrate level 68 goes above a preset point, controller 130 increases the air pressure in air line 136 which actuates diaphragm operator 76 which opens valve 78 and drains concentrate 40 from the evaporator 32. The concentrate is then treated for demineralization in the plant 88 from which it is conducted to the storage tank 90.

If the concentrate level 68 is above or below a predetermined set point, audible or visual alarms are actuated by signals from level controller 130.

An air line 132 is connected between level controller 130 and boric acid controller 126. If the level of concentrate 68 is below the steam coils, controller 130 sends an air signal to boric acid controller 126 which prevents controller 126 from opening valve 62 for admitting steam to coils 66 even though the boric acid concentration of concentrate 40 is below 12%. In other words, so long as the concentrate level 68 is above the steam coils, the concentration of the boric acid solution is the controlling factor in admitting or not admitting steam into heating coil 66.

As was explained above with respect to FIG. 1, the steam leaving the upper end of the evaporator 32 passes through the conduit 38 to a demineralizing plant 92 and then to the storage tank 94 where it is held until needed.

Accordingly, the device of the present invention provides means and methods for accommodating relatively large changes in daily or weekend load requirements in electrical output from a chemical shim nuclear power plant in which the boric acid concentration in the reactor coolant system must be varied. During operation of the reactor the boric acid concentration in the coolant system is increased or decreased as necessary to follow the xenon transients. The concentration is increased by draining coolant from the reactor coolant system and replacing it with concentrated boric acid. The boric acid concentration is reduced by draining coolant from the reactor coolant system and replacing it with demineralized water. The device of the present invention provides for highly accurate control means for maintaining the desired concentration of boric acid solution available for reuse in the reactor.

It will be understood that the disclosure be construed as illustrative of the invention and not in limitation thereof.

What is claimed is:

1. A neutronic reactor in which a water coolant containing boric acid is used as chemical shim wherein a coolant system is provided for circulating the coolant through the reactor, the combination with the coolant system of evaporator means for separating the coolant into steam and a boric acid concentrate; means for heating the boric acid concentrate within the evaporator means; means for circulating the concentrate through a circuit of which the evaporator chamber is one element; analyzing means associated with the evaporator means for analyzing the boric acid concentration in the concentrate and for energizing means for withdrawing at least a part of the concentrate from the evaporator means when the boric acid concentration exceeds a preset value; and means associated with the analyzing means to increase the heating means when the boric acid concentration is below the preset value and to decrease the heating means when the boric acid concentration is above the preset value.

2. The device of claim 1 in which means are provided for detecting the upper and lower limits of the level of boric acid concentrate in the evaporator chamber.

3. The device of claim 2 in which the detecting means is operative to increase the heating means when the boric acid concentrate level is at the upper limit.

4. The device of claim 2 in which the detecting means is operative to decrease the heating means when the concentrate level is at the lower limit.

5. The device of claim 2 in which the detecting means is operative to divert concentrate from the conduit when the level of concentrate is at the upper limit.

6. The device of claim 1 in which means are provided for detecting the upper and lower limits of the level of boric acid concentrate in the evaporator chamber, and the detecting means is operative to increase the heating means when the boric acid concentrate level is at the upper limit and to decrease the heating means when the concentrate level is at the lower limit.

7. The device of claim 3 in which operation of the detecting means and the analyzing means are coincident for increasing and decreasing heating means.

8. The device of claim 5 in which operation of the detecting means and the analyzing means are coincident for diverting the concentrate from the conduit.

9. The method for recovering concentrated boric acid from a relatively dilute aqueous solution thereof including the steps of flash evaporating hot dilute aqueous solution of boric acid into a container within upper and lower level limits, analyzing and comparing the boric acid concentration of the solution with a preset value, applying heat to the boric acid solution when the boric acid concentration is below the preset value, withdrawing concentrated boric acid from the container when the solution concentration is above the preset value and when the level is above the lower level limit but below the upper level limit, and applying heat to the solution when the level is above the lower level limit, said applied heat causing evaporation of water from the solution.

10. The method of claim 9 in which the step of withdrawing concentrate from the container is coincidentally dependent upon the boric acid concentration being greater than the preset value.

11. The method of claim 9 in which the step of applying heat to the aqueous solution is coincidentally dependent upon the boric acid concentration being less than the preset value.

12. The method of claim 10 in which the step of applying heat to the aqueous solution is coincidentally dependent upon the boric acid concentration being less than the preset value.

References Cited

UNITED STATES PATENTS

| 1,726,321 | 8/1929 | Simonson et al. | 23—306 |
| 2,124,729 | 7/1938 | Castner et al. | 23—306 |
| 2,711,388 | 6/1955 | Mottern et al. | 159—2 |
| 2,989,454 | 6/1961 | Breden et al. | 176—22 |
| 3,001,978 | 9/1961 | McLeod | 159—48 |
| 3,036,057 | 5/1962 | Wallace | 159—48 |
| 3,228,754 | 1/1966 | Robbins et al. | 23—276 |

CARL D. QUARFORTH, *Primary Examiner.*

L. DEWAYNE RUTLEDGE, *Examiner.*

H. E. BEHREND, *Assistant Examiner.*